Jan. 13, 1959

J. E. MINTY ET AL 2,868,581

CARGO RELEASE HOOK

Filed July 18, 1955

Inventors
John E. Minty
Howard C. Stevens
Hill, Sherman, Meroni, Gross & Simpson
Attys Jan. 13, 1959  J. E. MINTY ET AL  2,868,581
CARGO RELEASE HOOK
Filed July 18, 1955  3 Sheets-Sheet 2

Inventors
John E. Minty
Howard C. Stevens
By Hill, Sherman, Meroni, Gross & Simpson Attys

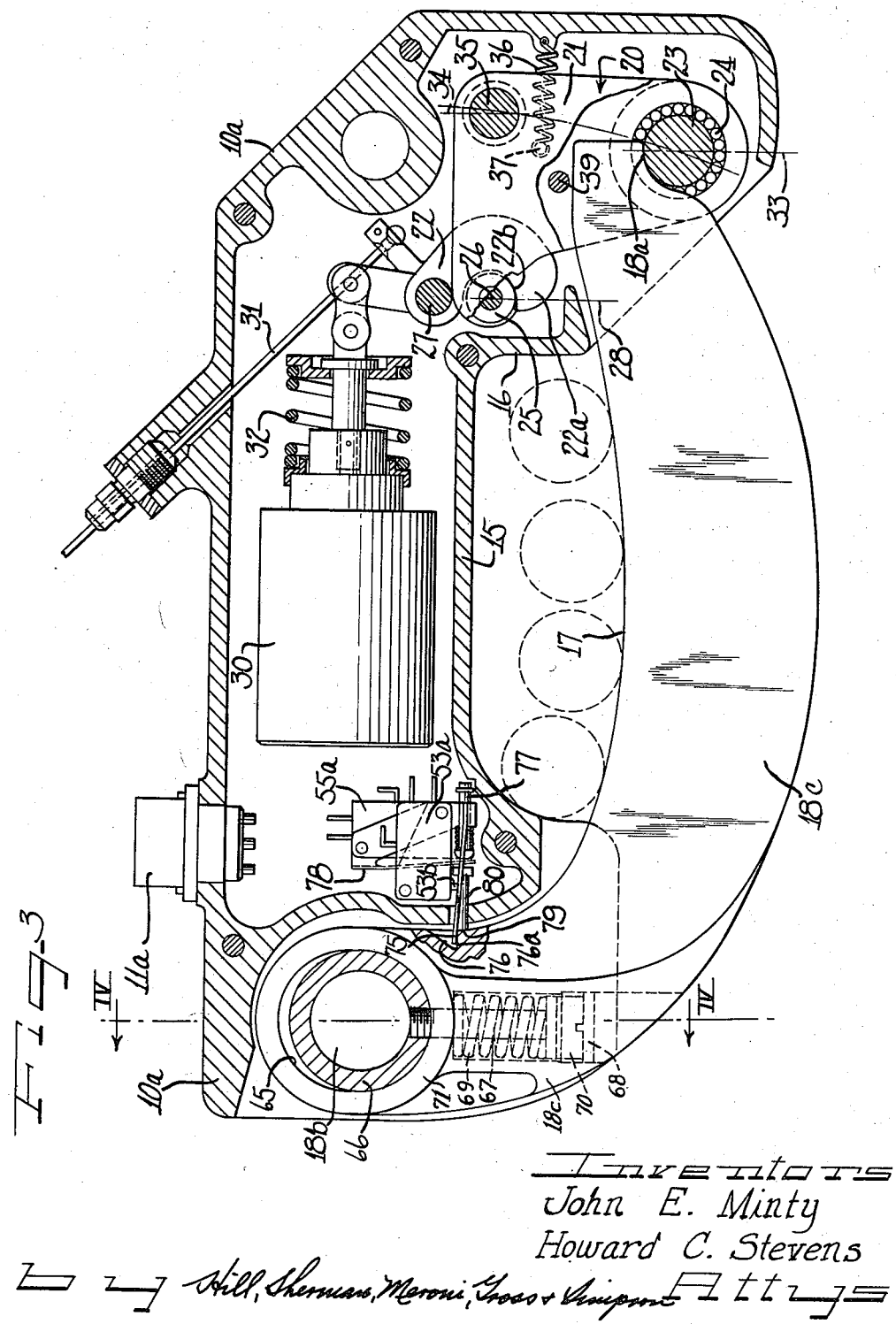

United States Patent Office 2,868,581
Patented Jan. 13, 1959

2,868,581

CARGO RELEASE HOOK

John E. Minty and Howard C. Stevens, Muskegon, Mich., assignors to Manning, Maxwell & Moore, Inc., Muskegon, Mich., a corporation of New Jersey Application July 18, 1955, Serial No. 522,740

11 Claims. (Cl. 294—83)

The present invention relates to cargo lifting hooks or the like for suspending loads from an overhead crane, aircraft or other similar overhead support by means of ropes or cables. More particularly, the invention is concerned with the provision of an improved cargo cable hook capable of supporting a load held by a plurality of cables or lines and which is provided with improved automatic release apparatus such that the cables are released when the cargo or load has been deposited upon the ground or a similar support and the weight thereof removed from the hook surface.

Cargo hooks have long been known and utilized. Aside from our own copending application Serial No. 498,351, filed March 31, 1955, however, none of the prior art cargo hooks have, to our knowledge, provided completely satisfactory cargo control. As in the case of the above mentioned copending application, the present invention relates to an automatically controlled cargo release hook capable of efficient automatic action while retaining relative mechanical simplicity. Further, by means of the present invention a high strength cargo release hook capable of handling heavy duty loads is provided with a very sensitive release mechanism capable of discharging the load holding cables or lines from the hook upon reduction in the load to a small fraction of its full weight, or alternatively, upon a decision to open the hook manually under full load.

In accordance with the present invention, a cargo release hook is provided having a substantially horizontally disposed hook body which combines with a pivotally mounted, substantially horizontal hook portion which supports the load carrying cables. This hook portion is normally latched to the body portion and is pivoted to the body portion in such a manner as to change its relationship relative thereto upon an increase or decrease in load weight above or below a predetermined automatic release weight. Through positioning control functions at the pivot of the hook, additional load sensing means are unnecessary. In one preferred embodiment of the invention the cable carrying hook is pivoted to the body through an eccentric cam pivot such that changes in load upon the hook portion will cause a modification of the horizontal position of the eccentricity. This horizontal change in position is utilized for the actuation of control switches. In another preferred embodiment of the invention the connection between the hook and the body is provided by a pin and vertical slot such that the hook may move vertically relative to the pin under the influence of a spring biasing means as soon as the load has been relieved to a predetermined minimum.

It is, accordingly, an object of the present invention to provide a cargo hook constructed to automatically release a cable carried load when that load is rested upon a support.

Another object of the present invention is to provide a novel and improved cargo release hook capable of automatically releasing a cable held load upon the application of external means to support the load and at the same time susceptible of anti-friction manual actuation where automatic release is impractical or undesired.

Still a further object of the present invention is to provide a cargo release hook having a substantially horizontal load carrying portion pivotally mounted about a point above and laterally within the horizontal widths of the said load carrying portion and having a pivotal connection with the main body of the hook constructed for control movement upon changes in load.

A feature of the invention resides in the provision of a novel load sensitive pivotal connection operable under load variations to control actuation of the cargo release hook.

Another object of the present invention is to provide a novel and improved cargo release hook constructed of a minimum of parts while retaining maximum strength and versatility.

A feature of one form of the present invention is the utilization of an eccentric pivot pin for supporting one end of a load carrying hook, combined with spring bias tending to position the eccentric in a predetermined angular position such that changes in load on the hook cause a variation in said position.

A feature of another form of the invention is the provision of a pin and slot connection between a load carrying hook and its support whereby variations in load may actuate hook control mechanisms.

Still a further object of the present invention is to provide an improved, adjustable, load-release cargo hook having an anti-friction latch.

Still other and further objects and features will at once appear to those skilled in the art from a consideration of the attached drawings wherein two preferred embodiments of the present invention are shown by way of illustration only and wherein:

Figure 3 is a partial side elevational view in cross-section illustrating a second embodiment of the present invention;

As shown on the drawings:

Figure 1:
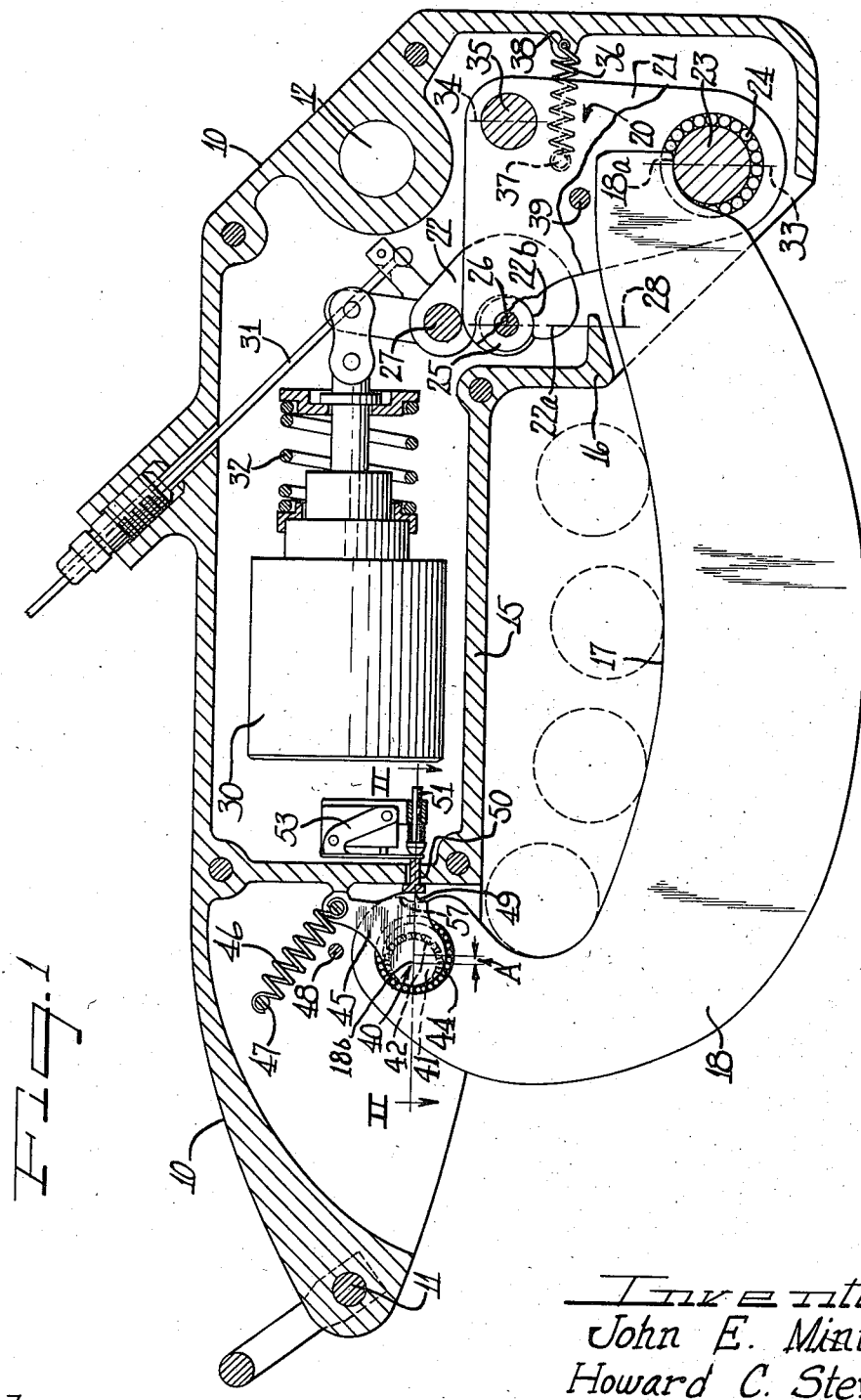
Figure 1 is a side elevational view in cross-section of a cargo release hook constructed in accordance with the present invention.
Figure 2:
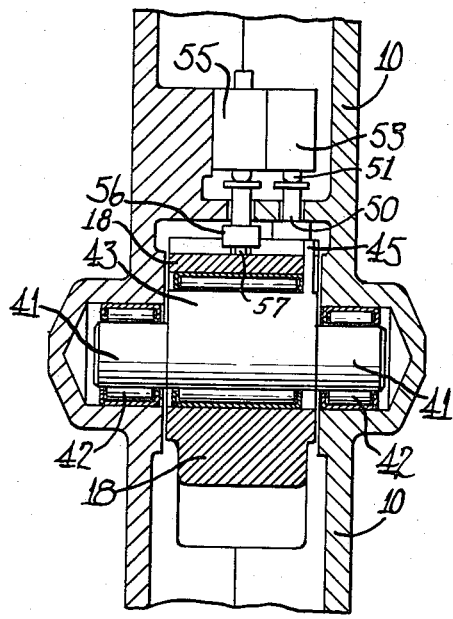
Figure 2 is a cross-sectional view taken along the line II—II of Figure 1 illustrating in detail switch actuation portions thereof.

As shown in the modification in Figures 1 and 2, the cargo hook of the present invention comprises a housing, or body, generally indicated at 10 having a pair of supporting eyes 11 and 12 by which the housing may be supported from overhead ropes or the like in a conventional manner. In the form shown in Figure 1 at least two overhead cables are necessary but it will be understood that in some uses it may be desirable to place a single aperture approximately midway of the housing, or body, 10 for support from a single overhead cable. This latter arrangement is less satisfactory since it does not provide as stable a hook. Such an arrangement is, however, sometimes found necessary as a result of space limitations and is considered within the scope of the present invention.

The housing 10 is provided with a line or cable retaining pocket formed by housing walls 15 and 16 in cooperation with the upper surface 17 of hook member 18. In ordinary usage four cable loops, secured to a load, are passed over the hook member 18 as indicated in dotted lines whereby the load is suspended upon said upper surface 17 of the hook.

A heavy duty anti-friction latch generally indicated at 20 is provided for maintaining the hook 18 in its pocket forming, load-carrying position. As illustrated, this comprises a pivotal dog 21 maintained in the latched position shown in Figure 1 by a trigger 22. The dog 21 carries a hook engaging shaft 23 supported in the sear by roller bearings 24, thereby permitting anti-friction rotation of the shaft 23 during operation. Likewise, the trigger 22 cooperates with the roller 25 carried by shaft 26 fixed to the sear 21 said roller 25 thereby providing an anti-friction bearing surface between the dog 21 and the trigger 22. As may be seen, the trigger 22 is pivotally mounted about pivot pin 27 carried by the housing 10 in such a manner as to bring the dog shaft 26 substantially directly under the pin 27 and with the end 22a extending slightly beyond the center line 28. With this arrangement, the trigger 22 must be positively actuated in order to release the dog 21 for rotation in counter-clockwise direction.

Actuation of the trigger 22 is accomplished electrically by means of a solenoid 30 or, alternatively, manually by means of a Bowden wire 31. Energization of the solenoid 30 may be manual or automatic as will be described in more detail below. The trigger 22 is normally biased into the dog retaining position by means of the spring 32 which provides a substantial bias in the clockwise direction.

The vertical center line of the shaft 23, as indicated at 33, as may be seen from Figure 1, is positioned to the left of the vertical center line 34 of the pivot pin 35 upon which the dog 21 is supported. With a substantially horizontal latch surface 18a and the hook member 18 it will be seen that the load on the hook 18 tends to force the dog 21 to move in a counterclockwise direction to move the shaft 23 out from under the hook latch surface 18a. Accordingly, once the trigger 22 has released the dog 21, the load on the hook itself will cause the dog 21 to release the hook. The amount of self-energization thus accomplished may, of course, be varied by changing the horizontal distance between the center lines 33 and 34 and/or changing the latch surface 18a away from the horizontal. Since the hook member 18 is pivotally mounted about a point 18b, the hook latch surface 18a will move on the surface of shaft 23, the end portion of said hook 18 passing substantially through an arc running through the centers of shafts 23 and 35. Accordingly, in the latter form of adjustment, if the surface 18a is inclined in a clockwise direction, the degree of self-energization is reduced while if inclined in a counterclockwise direction the degree of self-energization is increased.

The force tending to urge the dog 21 in the counter-clockwise direction is, of course, only a small fraction of the total force acting downwardly on the shaft 23 as a result of the load on the hook 18. This relatively small force is the only load on the trigger 22 and accordingly the latch structure here utilized is operable with a relatively small amount of power even though tremendous loads are placed on the hook itself.

The spring 36 is secured to the dog 21 at pin 37, and to the housing 10 at 38 to apply a small bias to the dog 21 in the counterclockwise direction. This bias is provided to maintain the dog 21 in its extreme counterclockwise direction so that the shaft 23 will be positioned out of the path of movement of the hook 18 in the hook loading and latching condition. With the parts so positioned, and subsequent to the positioning of loaded cables on the top surface 17 of the hook member 18, the member 18 is moved upwardly in a counterclockwise direction past the shaft 23 and into contact with pin 39 after which the dog 21 is pivoted in the clockwise direction until the roller 25 seats in the recess 22b of the trigger 22.

Automatic control of the cargo release hook of the present invention is provided at the pivot member of the hook 18. In the embodiment shown in Figures 1 and 2, this automatic control is provided through the use of an eccentric pivot member generally indicated at 40. The eccentric 40 is pivotally mounted about stud pivot portions 41 anti-frictionally carried by the housing 10 in roller bearings 42. The central, eccentric portion 43 is pivotally mounted relative to the hook member 18 by means of anti-friction roller bearings 44 thereby providing a free pivotal motion between the hook 18 and the eccentric 43 as well as between the eccentric pivots 41 and the housing 10. In view of the displacement of the centers of the pivots 41 and the eccentric 43, shown as the distance A in Figure 1, the application of a load to the hook member 18 will cause the eccentric to move in a clockwise direction about its pivots 41. The lever arm 45 is secured to the eccentric 40 for rotation therewith. As shown, this lever arm may be provided conveniently at one end of the eccentric portion 43 but it will be understood that it may be placed at any convenient position along the length of the eccentric member 40. The arm is biased in the counterclockwise direction by means of a spring 46 secured to the housing at pin 47 whereby the arm is normally biased into engagement with the stop pin 48 when the hook member 18 is unloaded. In such position, a cut-out portion 49 on the lever arm 45 is positioned over switch plunger 50 thereby permitting the plunger 50 to move to the left permitting the spring biased plunger 51 to move the switch control lever 53 to the left into the switch-closed condition in which the solenoid 30 is energized to release the latch 20. Thus, if the load carried by the cargo release hook is lowered to a position in which it lies on the ground and the load is thus removed substantially from the hook 18, the spring 46 will cause the eccentric to pivot in the counterclockwise direction and the cut-away cam portion 49 will permit closure of the switch 53 with the resultant unlatching and release of the load entirely.

An additional switch 55 is secured to the housing 10 in a position adjacent to the switch 53. Switch 55 is provided with an actuating button 56 which cooperates with cam surface 57 on hook 18 such that when hook 18 rotates in the clockwise direction upon release of the load the cam surface 57 will urge the plunger 56 toward the switch 55 to open the switch circuit to the solenoid 30. Accordingly, in all conditions in which the hook 18 is open, the solenoid 30 is de-energized. This eliminates any possibility of overheating the solenoid during periods of inactivity.

A control circuit utilizing the two switches 53 and 55 described above is shown in Figure 5. There, the source of electrical current 60 supplies solenoid coil 30 through switches 53 and 55 under the control of a manual selector switch 61. The selector switch 61 is movable between positions marked A, O, M, indicating respectively automatic load release, operation during loading, and manual (electrical) unhooking or load release. As may be seen, in the automatic condition illustrated in Figure 5, switches 53 and 55 are connected in series and both are normally biased into the closed condition. When the hook 18 is under a loaded condition, however, the lever arm 45 will act in the direction of the arrow 62 to open the switch 53 until such time as the load on the hook member 18 is released. At that time, the switch 53 will close and the solenoid 30 will be energized. However, immediately upon opening of the hook 18 the cam surface 57 will operate in the direction of arrow 63 to open switch 55 thereby de-energizing the solenoid 30. Since the switch 55 is in series with all three stations of the selector switch 61, it will be apparent that under all circumstances of operation in which the hook 18 is in the downward condition, the solenoid 30 will be de-energized. The wiring connecting the switches in actual practice is not shown in the drawings, Figures 1 through 4, since it is in all cases conventional and its inclusion would confuse the mechanical portions of the drawings. Suffice it to say that the wiring may be brought into the housing through a terminal plug 11a and is in other respects substantially similar to that disclosed in our above noted copending application, Serial 498,351.

Figure 4:
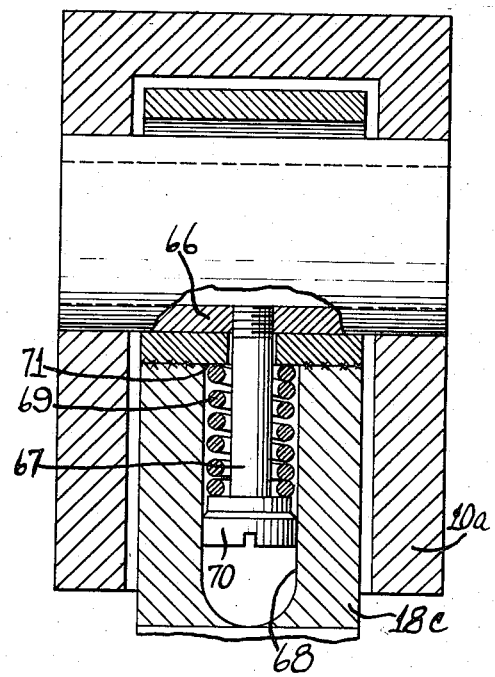
Figure 4 is a cross-sectional view taken along the line IV—IV of Figure 3.
Figure 5:
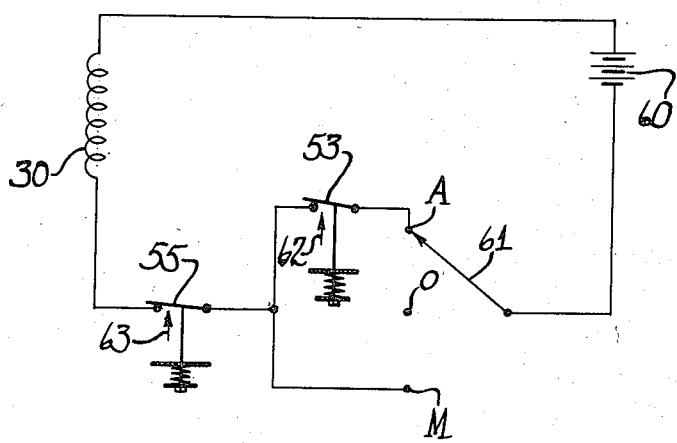
Figure 5 is a schematic diagram of the electrical control circuit forming a part of the system shown in Figures 1 and 2.

In the modified form of the invention shown in Figures 3 and 4, the latch member and its mechanical actuation are substantially identical to that shown in Figures 1 and 2. However, a modified control arrangement is provided, in which actuation of the switches 53 and 55 is accomplished directly by association of the switches with cam surfaces on the hook member 18 rather than through the use of eccentric actuated levers or the like. Thus, the hook 18c is provided with an elongated aperture 65 associated with the tubular pivot pin 66 rigidly secured in the frame 10a. As shown in Figure 4, the pin 66 is provided with a spring thrust pin 67 slidably mounted in the bore 68 of the hook 18c. A spring 69 is positioned between the head 70 of the pin 67 and the abutment shoulder 71 of the hook 18c and accordingly provides a constant bias urging the hook 18c up tightly against the tubular pin 66. This biasing force may, of course, be modified by changing the spring constant of the spring 69 or, alternatively, merely threading the pin 67 into the pin 66 to varying extents.

As a result of this elongated aperture or slot arrangement, the application of a downward load to the hook 18c as a result of the presence of load carrying cables, will cause the spring 69 to be compressed and the hook member 18c downwardly relative to the fixed pivot pin 66. Upon release of the load, as a result of depositing the load on the ground or other surface, the heavy load on the hook 18c will be relieved and the spring 69 will again urge the hook member 18c upwardly against the pin 66 into the position shown in Figure 3.

This vertical reciprocation of the hook member 18c under varying load conditions is utilized for the control of switches 53a and 55a. As shown, the switch 53a is provided with an actuating lever 75 positioned in notch 76 of the hook 18c. The lever 75 is, effectively, a spring, of substantially lesser spring constant than the spring 69, and tends to move downwardly away from the switch button 53b to cause the switch 53b to open. Thus, when a load is applied to the hook 18c the notch abutment 76a will move downwardly permitting the lever 75 to spring downwardly opening the switch 53b. When, however, the load on the hook 18c is released, the hook moves upwardly and the abutment surface 76a actuates the lever 75 to close the switch 63b to energize the solenoid 30.

Switch 55a is normally biased open by means of a spring pressed plunger 77 acting on lever 78. However, when the hook 18c is pivoted in its extreme counterclockwise direction into latching engagement, the surface 79 on the hook member 18c engages plunger 80 to remove the switch lever 78 into switch closed condition.

It will be noted from the above description that the control arrangement utilized in Figures 1 and 2 provides a pair of switches 53 and 55 normally spring biased closed but urged into the open position by cam elements while the embodiment shown in Figures 3 and 4 provides switches 53a and 55a normally spring biased into the open condition and closed by cam actuation. This difference is dictated by the structural arrangement of the parts but it will be obvious that the control functions are identical in effecting closure of the switch 53 or 53a upon release of the load on the hook 18 or 18c respectively and opening of the switch 55 or 55a upon opening of the hook 18 or 18c respectively. The bias of the switches 53a and 55a, as described above, is substantially identical to the showing in Figure 5 of our above identified copending application, at switches 54 and 65 respectively.

A novel hook securing construction is utilized in the embodiment shown in Figure 3 in that the hollow pivot pin 66 may be utilized for supporting the hook from overhead. This obviates the need for an extension at the left hand end of the housing and provides a substantially more compact unit. Since the pin 66 is rigidly fixed to the housing 10, the passage of supporting means therethrough will not affect the operation of the hook member 18c in any way.

It will thus be apparent to those skilled in the art that we have provided a substantially improved and simplified automatically controlled cargo release hook. Through the principles of the present invention a minimum number of parts is provided while at the same time providing an unusually frictionless, rugged and compact hoisting unit. It will, further, be apparent that variations and modifications may be made in accordance with the teachings of the present invention without departing from the scope of the novel concepts thereof. It is, accordingly, our intention that the scope of the present invention be limited only by that of the hereinafter appended claims.

We claim as our invention:

1. A cargo release hook comprising a body member, a horizontal hook member pivotally connected by one of its ends to said body member through a lost motion pin connection cooperating therewith for suspending a cargo on a portion of said hook member, a pivoted trigger means vertically mounted on said body for cooperating with a pivoted dog having a movable member for cooperating with the other end of said hook to maintain said hook in latched load suspending position, a solenoid for releasing said trigger and said dog, and a switch controlling the energization of said solenoid, said switch being mounted adjacent to said pin connection and responsive to horizontal movement in the relative movements and positions of said hook and said lost motion pin to energize said solenoid, and said lost motion connection comprising an eccentrically mounted pivot pin resiliently biased into a position in which the axis of rotation of the hook member thereabout is horizontally spaced from the axis of pivotal movement of said lost motion pin.

2. A cargo release hook comprising a body member, a hook member connected by one of its ends to said body member through a lost motion pin connection cooperating therewith for suspending a cargo on a portion of said hook member, trigger means on said body for cooperating with a pivoted dog having means for cooperating with the other ends of said hook to maintain said hook in latched load suspending position, a solenoid for releasing said trigger thereby releasing said dog, a switch controlling the energization of said solenoid, said switch being mounted adjacent to said pin connection and responsive to the horizontal movement of the relative positions of said hook and said pin to energize said solenoid, and said lost motion connection comprising an eccentrically mounted pivot pin resiliently biased into a position in which the axis of rotation of the hook member thereabout is horizontally spaced from the axis of pivotal movement of said pin.

3. A cargo release hook comprising a body member, a hook member horizontally arranged and connected by one of its ends to said body member through a lost motion pin connection cooperating therewith for suspending a cargo on a portion of said hook member, trigger means on said body for cooperating with roller means secured to a dog pivoted to said body, said dog having a movable member thereon for cooperating with the other end of said hook to maintain said hook in a horizontal and latched load suspending position, a solenoid for releasing said trigger thereby releasing said dog with said roller means and said movable member, and a switch controlling the energization of said solenoid, said switch being mounted adjacent said hook and pin connection and responsive to the movement of said hook due to variations in the relative horizontal positions of said hook and said pin to energize said solenoid, said lost motion pin connection comprising a pin rigidly secured in a horizontal axis to said body member and cooperating with a vertically elongated aperture in said hook.

4. A cargo release hook comprising a body member, a pivoted hook member horizontally arranged connected by one of its ends to said body member through a lost motion pin connection cooperating therewith for suspending a cargo on a portion of said hook member, trigger means on said body for association with a pivoted dog member, said dog member having a movable supporting member for the other end of said hook in latched condition for suspending said cargo on said hook, a solenoid for actuating said trigger to release said trigger means thereby releasing said dog and said hook, means normally biasing said one end of said hook upwardly, and a switch for controlling the energization of said solenoid, said switch being mounted adjacent to said hook and pin connection and having means thereon responsive to upward and horizontal movement of said one end of said hook to energize said solenoid to release said trigger.

5. A cargo release hook comprising a body member, a hook member pivotally connected by one of its ends to said body member through a lost motion pin connection and forming in cooperation therewith a cargo suspending horizontally arranged means, trigger means on vertically and pivotally mounted said body, a dog pivotally secured on said body and having a movable supporting member thereon, said trigger means cooperating with a roller on said dog for maintaining the other end of said hook in latched condition for suspending said cargo on said hook, a solenoid for actuating said trigger and said dog to release said hook from said movable supporting member, means normally biasing said one end of said hook upwardly, and a switch for controlling the energization of said solenoid, said switch being mounted adjacent the hook and pin connection and having means thereon responsive to upward and horizontal movement of said one end of said hook on said lost motion pin to control the energization of said solenoid to release said trigger, said trigger releasing said dog and said movable member for cooperating with a cam surface on the free end of said hook.

6. A cargo release hook comprising a body member, a hook member connected by one of its ends to said body member through a lost motion pin connection and forming in cooperation therewith a cargo suspending means, trigger means on said body for maintaining a movable element in latched position, said element comprising a movable element for supporting the other end of said hook in latched condition for suspending said cargo on said hook, a solenoid for actuating said trigger and dog to release said hook, means normally biasing said one end of said hook in a counterclockwise direction, and a switch for controlling the energization of said solenoid, said switch being mounted adjacent said hook and pin connection having means thereon responsive to movement in a counterclockwise direction of said one end of said hook to control the energization of said solenoid to release said trigger, said lost motion pin connection comprising an eccentric mounted pivot pin supporting said hook, and said last named means comprising a movable member in contact with said eccentrically mounted pivot pin for actuation thereby.

7. A cargo release hook comprising a body member, a hook member pivotally connected and horizontally arranged by one of its ends to said body member through a lost motion pin connection and forming in cooperation therewith a line suspending member, trigger means pivotally mounted on said body for cooperating with a roller member on a dog type element which has movable means to support the other end of said hook in horizontal and latched load suspension, a solenoid for actuating said trigger to release said roller member on said dog and said movable means supporting said hook, means normally biasing said one end of said hook upwardly, a first switch controlling the energization of said solenoid, said switch being mounted on said body adjacent said hook and pin connection and responsive to variations in vertical and horizontal positions of said hook and said pin during lost motion movement to control the energization of said solenoid by closing said switch when said hook is in its uppermost position, and a second switch mounted on said body and associated with said hook whereby release of said hook by said trigger and dog element in response to actuation of said first switch will actuate said second switch into an open position in which said solenoid is deenergized.

8. A cargo release hook comprising a body member, a hook member connected by one of its ends to said body member through a lost motion pin connection and forming in cooperation therewith a carge suspending member, trigger means on said body for cooperating with a dog pivotally mounted on said body, said dog cooperating with the other end of said hook to maintain said hook in cargo suspending position, a solenoid for release of said trigger, and a switch controlling the energization of said solenoid, said switch being mounted on said body adjacent said hook and pin connection and responsive to variations of movements thereof effected by the relative positions of said hook and said pin to control the energization of said solenoid, said trigger means comprising a jaw flange, said dog comprising a roller for cooperating with said jaw flange, said dog comprising a movable member positioned below the pivot of said dog means contacting said trigger whereby actuation of said trigger by said solenoid will release said dog, and a load on said hook will move said movable member on said dog out of engagement with said hook.

9. A cargo release hook comprising a body member, a hook member horizontally arranged and pivotally connected by one of its ends to said body member through a lost motion pin connection and forming in cooperation therewith a horizontally arranged cargo suspension member, latch means on said body for cooperating with the other end of said hook to maintain said hook in cargo suspension position, said latch means incorporating a trigger pivotally and vertically mounted to said body member, and a dog element, said dog element embodying a roller for contacting said trigger and a movable member for supporting the free end of said hook, a solenoid for releasing said latch and a switch controlling the energization of said solenoid, said switch mounted upon said body member adjacent said hook and pin connection and responsive to horizontal movements and variations in the relative positions of said hook and said pin to control the energization of said solenoid, said lost motion pin connection comprising a hollow tubular pin and a suspension means passing through said pin for supporting said body member at its pivoted end.

10. In a device of the character described, the combination comprising: a body structure, a hook member arranged horizontally when loaded and pivoted at one end in said body through a lost motion pin connection for providing swinging movements to open or closed position, trigger means pivotally and vertically mounted on a laterally extending pivot on said body, dog means pivotally mounted on said dog means embodying a roller member to one side of its pivot and a movable member below its pivot, said body, said trigger means cooperating with said dog means for interconnecting the body structure and the free end of the hook member in its closed position, electromagnetic means to release said trigger means and said dog means including an energizing circuit, and the horizontal movement of said hook upon said lost motion pin connection controlling a switch in said circuit in response to the application and withdrawal of load forces on said hook.

11. In a device of the character described, the combination comprising: a body structure, a cargo supporting hook member extending below said body structure and being pivoted at one end in said body structure by a lost motion pin connection for swinging movements to vertical open and horizontal closed positions with the body structure and adapted to bridge the hook ends in the closed position, a pivoted trigger means cooperating with a roller member on a pivoted dog and said dog having a movable member below its pivot to interconnect the body structure and free end of the hook member in its closed position, and means comprising an energizing circuit including a switch controlled by the vertical movement and the horizontal movement of said hook with said lost motion pin connection to release said trigger and said dog in response to withdrawal of a suspended load pressure acting on said hook from said movable member on said dog.

References Cited in the file of this patent

UNITED STATES PATENTS

| | | |
|---|---|---|
| 987,578 | Kersteter | Mar. 21, 1911 |
| 2,328,341 | Higgins et al. | Aug. 31, 1943 |
| 2,380,737 | Elliott | July 31, 1945 |
| 2,625,423 | Hight | Jan. 13, 1953 |